United States Patent
Packer et al.

(10) Patent No.: US 7,608,296 B2
(45) Date of Patent: Oct. 27, 2009

(54) ANVIL FOR FRICTION STIR WELDING HIGH TEMPERATURE MATERIALS

(75) Inventors: Scott M. Packer, Alpine, UT (US); Tracy W. Nelson, Provo, UT (US); Carl D. Sorensen, Provo, UT (US)

(73) Assignees: Brigham Young University, Provo, UT (US); SII MegaDiamond, Inc., Provo, UT (US); Advanced Metal Products, West Bountiful, UT (US)

( * ) Notice: Subject to any disclaimer, the term of this patent is extended or adjusted under 35 U.S.C. 154(b) by 449 days.

(21) Appl. No.: 11/374,667

(22) Filed: Mar. 13, 2006

(65) Prior Publication Data

US 2006/0208034 A1    Sep. 21, 2006

Related U.S. Application Data

(60) Division of application No. 10/843,208, filed on May 11, 2004, now abandoned, which is a continuation of application No. 10/171,272, filed on Jun. 11, 2002, now Pat. No. 6,732,901.

(60) Provisional application No. 60/297,738, filed on Jun. 12, 2001.

(51) Int. Cl.
*B05D 1/12* (2006.01)
(52) U.S. Cl. .................. 427/190; 427/191; 427/192; 427/201
(58) Field of Classification Search ......... 427/190–192, 427/201
See application file for complete search history.

(56) References Cited

U.S. PATENT DOCUMENTS

| 4,144,110 | A | 3/1979 | Luc |
| 5,460,317 | A | 10/1995 | Thomas et al. |
| 5,611,479 | A | 3/1997 | Rosen |
| 5,697,511 | A | 12/1997 | Bampton |

(Continued)

FOREIGN PATENT DOCUMENTS

EP    0 797 043 A2    9/1997

(Continued)

OTHER PUBLICATIONS

A page from the University of South Carolina's website regarding "Friction Stir Welding." The URL is http://www.engr.sc.edu.

(Continued)

*Primary Examiner*—Frederick J Parker
(74) *Attorney, Agent, or Firm*—Morriss O'Bryant Compagni, PC

(57) ABSTRACT

A friction stir welding anvil and method of producing a friction stir welding anvil that precludes diffusion or mechanical bonding of the anvil to the work pieces are provided. The alternatives for producing such an anvil comprise coating the anvil with diffusion barriers such as oxides, nitrides, intermetallics, and/or refractory metals; manufacturing an anvil either completely or partially from the same; or placing a coating of such materials in the form of a thin sheet or a powder between the anvil and the work pieces. The anvil disclosed herein exhibits high strength and hardness even at elevated temperatures, such as those greater than 800° C., so as to prevent the anvil from mechanically or diffusion bonding to the work pieces and so as to minimize, or eliminate altogether, anvil deformation.

6 Claims, 2 Drawing Sheets

U.S. PATENT DOCUMENTS

| | | | |
|---|---|---|---|
| 5,713,507 A | 2/1998 | Holt et al. | |
| 5,718,366 A | 2/1998 | Colligan | |
| 5,758,999 A | 6/1998 | Geise | |
| 5,769,306 A | 6/1998 | Colligan | |
| 5,794,835 A | 8/1998 | Colligan et al. | |
| 5,811,755 A | 9/1998 | McGee et al. | |
| 5,813,592 A | 9/1998 | Midling et al. | |
| 5,829,664 A | 11/1998 | Spinella et al. | |
| 5,971,247 A | 10/1999 | Gentry | |
| 5,971,252 A | 10/1999 | Rosen et al. | |
| 5,975,406 A | 11/1999 | Mahoney et al. | |
| 6,045,027 A | 4/2000 | Rosen et al. | |
| 6,045,028 A | 4/2000 | Martin et al. | |
| 6,050,474 A | 4/2000 | Aota et al. | |
| 6,050,475 A | 4/2000 | Kinton et al. | |
| 6,051,325 A | 4/2000 | Talwar et al. | |
| 6,053,391 A | 4/2000 | Heideman et al. | |
| 6,070,784 A | 6/2000 | Holt et al. | |
| 6,138,895 A | 10/2000 | Oelgoetz et al. | |
| 6,168,066 B1 | 1/2001 | Arbegast | |
| 6,168,067 B1 | 1/2001 | Waldron et al. | |
| 6,173,880 B1 | 1/2001 | Ding et al. | |
| 6,193,137 B1 | 2/2001 | Ezumi et al. | |
| 6,206,268 B1 | 3/2001 | Mahoney | |
| 6,344,117 B2 | 2/2002 | Enomoto et al. | 204/298.09 |
| 6,523,732 B1 * | 2/2003 | Popoola et al. | 228/1.1 |
| 6,732,901 B2 | 5/2004 | Nelson et al. | 228/2.1 |

FOREIGN PATENT DOCUMENTS

| | | |
|---|---|---|
| EP | 0 810 054 A1 | 12/1997 |
| EP | 0 833 097 A2 | 4/1998 |
| EP | 0 867 254 A1 | 9/1998 |
| EP | 0 810 056 A3 | 12/1998 |
| EP | 0 888 843 A1 | 1/1999 |
| EP | 0 893 189 A2 | 1/1999 |
| EP | 0 893 190 A2 | 1/1999 |
| EP | 0 925 964 A2 | 6/1999 |
| EP | 0 928 659 A1 | 7/1999 |
| EP | 0 947 280 A1 | 10/1999 |
| EP | 0 810 055 B1 | 12/1999 |
| EP | 0 968 788 A2 | 1/2000 |
| EP | 0 972 605 A2 | 1/2000 |
| EP | 0 985 483 A2 | 3/2000 |
| EP | 0 992 314 A2 | 4/2000 |
| EP | 1 029 627 A1 | 8/2000 |
| EP | 1 046 453 A2 | 10/2000 |
| EP | 1 048 390 A2 | 11/2000 |
| EP | 1 055 478 A1 | 11/2000 |
| EP | 1 057 572 A2 | 12/2000 |
| EP | 1 057 573 A2 | 12/2000 |
| EP | 1 057 574 A2 | 12/2000 |
| EP | 1 057 575 A2 | 12/2000 |
| EP | 1 057 576 A2 | 12/2000 |
| GB | 2 306 366 A | 5/1997 |
| WO | WO 93/10935 | 6/1993 |
| WO | WO 97/15462 | 5/1997 |
| WO | WO 97/48517 | 12/1997 |
| WO | WO 98/13167 | 4/1998 |
| WO | WO 98/45080 | 10/1998 |
| WO | WO 98/51441 | 11/1998 |
| WO | WO 98/58759 | 12/1998 |
| WO | WO 99/32254 | 7/1999 |
| WO | WO 99/32255 | 7/1999 |
| WO | WO 99/33594 | 7/1999 |
| WO | WO 99/34951 | 7/1999 |
| WO | WO 99/39861 | 8/1999 |
| WO | WO 99/52669 | 10/1999 |
| WO | WO 99/54081 | 10/1999 |
| WO | WO 99/58288 | 11/1999 |
| WO | WO 99/65637 | 12/1999 |
| WO | WO 00/02698 | 1/2000 |
| WO | WO 00/02699 | 1/2000 |
| WO | WO 00/02704 | 1/2000 |
| WO | WO 00/03818 | 1/2000 |
| WO | WO 00/56497 | 9/2000 |

OTHER PUBLICATIONS

Pages from the website for TWI World Centre for Materials Joining Technology regarding "Friction Stir Welding at TWI." The URL is http://www.twi.co.uk/j32k/unprotected/band_1/fswintro.html.

* cited by examiner

ANVIL FOR FRICTION STIR WELDING HIGH TEMPERATURE MATERIALS

RELATED APPLICATIONS

This application is a Division of U.S. patent application Ser. No. 10/843,208 filed May 11, 2004, now abandoned, which is a Continuation of U.S. patent application Ser. No. 10/171,272 filed Jun. 11, 2002, now issued as U.S. Pat. No. 6,732,901 and claims priority therethrough to U.S. Provisional Patent Application Ser. No. 60/297,738 filed Jun. 12, 2001, entitled ANVIL FOR FRICTION STIR WELDING HIGH TEMPERATURE MATERIALS, now issued as U.S. Pat. No. 6,732,901.

BACKGROUND OF THE INVENTION

1. Field of the Invention

This invention relates to friction stir welding and, more particularly, to an anvil used in friction stir welding processes that is either coated with or manufactured from a substance capable of resisting anvil deformation and preventing diffusion bonding or mechanical bonding between the anvil and the friction stir welding tool or work piece when friction stir welding high temperature materials or work pieces.

2. Background and Related Art

Friction welding has been used for years in the welding industry. For example, when the ends of two pipes are pressed together and simultaneously turned in opposite directions to one another heat is generated and causes the ends of the pipes to become plasticized and bonded. Rapidly stopping rotation of the pipes causes the two pipes to fuse together.

Friction stir welding, on the other hand, is a relatively new technique, and was first described in U.S. Pat. No. 5,460,317, issued Oct. 24, 1995. Friction stir welding involves pressing a non-consumable friction stir welding tool with a profiled probed end against two work pieces at the point where they come in contact with one another. Cyclical movement of the probed end of the tool generates heat as it presses against the two work pieces. The probed end of the tool enters or plunges into the two work pieces in a plasticized region created by the friction of the probed end. The probed end can then be slowly moved to a region where the two pieces abut each other, thereby enabling the area between the two pieces, which is beneath the probed end, to solidify together.

There are a number of advantages to friction stir welding. Among these include the fact that during friction stir welding the material heated is not exposed to combustion products. This reduces chemical changes in the work pieces due to the interface of the work pieces with the tool and its byproducts. Another advantage of friction stir welding is that the temperature of the work pieces, even in the heated region, tends not to be as high as the temperature resulting from conventional welding processes. This reduced temperature reduces oxidation of the work pieces due to ambient atmosphere, thereby reducing the need to provide an inert atmosphere at the weld location.

Friction stir welding has traditionally been limited to welding of low melting temperature materials such as aluminum alloy, copper alloys, lead and magnesium alloys because of the wear on the probed end. These materials are effectively joined using standard steel backing supports or anvils. However, recent advances in technology allow for the friction stir welding of harder, previously unweldable materials.

In order to join so-called 'higher temperature materials' such as steels, stainless steels, nickel alloy or titanium alloys, it is necessary to employ increased temperatures and forces. These increased temperatures and forces present new problems. For instance, such high temperature materials can lead to diffusion or mechanical bonding of the work pieces to the anvil. Moreover, friction stir welding of high temperature work pieces may cause unwanted and added deformation of the anvil.

The current trend in the art when joining high temperature materials is to avoid full penetration with the probed end so as to reduce the probability that diffusion or mechanical bonding of the work pieces to the anvil occurs. Unfortunately, if the probed end penetrates only a small amount into the joint, only a portion of the joint is heated and joined, and the weld is not as strong as when the weld is fully penetrated through the joint region. In addition, the material is not fully plasticized in the entire welded seam, causing a portion of the apparently welded region to be in the form of a lap weld, which is a region where the material from one of the work pieces overlaps onto, but does not fully bond with, the material of adjacent work pieces. The weakness of such a weld is not always obvious or at least visible upon a precursory inspection.

Recent trends in the art attempt to achieve full penetration welds. A number of inventions deal with adding a chamfer or a groove to the anvil or the work pieces. (See U.S. Pat. Nos. 5,611,479 and 5,769,306.) Additionally, a number of patents focus on using a feedback control system to control the depth of the pin, thereby controlling the level of penetration. (See U.S. Pat. Nos. 6,168,066 and 6,173,880.)

U.S. Pat. No. 6,168,066 incorporates a ceramic sensor plate for sensing magnetic fields and eddies to control the depth of the magnetic friction stir welding tool in softer non-magnetic materials.

Accordingly, it would be an improvement in the art to augment or even replace the current techniques with other techniques.

SUMMARY OF THE INVENTION

It is an object of some embodiments of the present invention to provide a friction stir welding anvil that forms a diffusion barrier between the work pieces and the anvil when friction stir welding.

It is another object of some embodiments of the present invention is to provide an improved friction stir welding anvil that allows for the welding of materials and work pieces normally considered 'rigid' and difficult to weld with conventional friction stir welding anvils.

A further object of some embodiments of the present invention is to provide an improved friction stir welding anvil that allows for full penetration welding of materials currently difficult to friction stir weld with conventional friction stir welding anvils.

Yet another object of some embodiments of the present invention is to provide an improved friction stir welding anvil that resists the usual deformation attributable to the anvil when friction stir welding high temperature work pieces and materials.

An even further object of some embodiments of the present invention is to provide a friction stir welding anvil that prevents diffusion bonding between the work pieces and the anvil when friction stir welding.

Another object of some embodiments of the present invention is to provide a friction stir welding anvil that prevents mechanical bonding between the work pieces and the anvil when friction stir welding.

A further object of some embodiments of the present invention is to provide a friction stir welding anvil that is either coated with or manufactured from at least one chemically inert material that enables a diffusion barrier to form between the work pieces and the anvil.

Another object of some embodiments of the present invention is to provide a number of materials that can be used to coat an anvil or from which an anvil can be manufactured so as to enable superior performance than is available with current friction stir welding anvils.

Further objects, features, and advantages of the invention will become apparent to those skilled in the art from a consideration of the following detailed description taken in combination with the accompanying drawings.

In a preferred embodiment, a system is provided whereby a friction stir welding anvil is manufactured from a chemically inert material such as an Oxide, Nitride, Carbide or Silicate. In the embodiment, the anvil is a generally flat plate or rotating wheel that supports the work pieces while friction stir welding. Alternatively, instead of the anvil being comprised of the aforementioned materials, the chemically inert material is used to coat the anvil.

The following are alternatives for the method of application or manufacturing of the anvil using the above referenced materials. In one embodiment, the anvil is created by directly spray-coating the metallic anvil with the chemically inert material. Alternatively, the anvil is coated with the chemically inert material by chemical or vapor deposition. The anvil may also be coated with the chemically inert material through anodizing or may be coated with the chemically inert material through ion beam sintering. Further, the anvil may be a complete insert comprised of the chemically inert material or the anvil may be coated with a powdered form of the chemically inert material. Furthermore, the anvil may be coated with a powdered form of the chemically inert material by slurry. Alternatively, the anvil may be coated with the chemically inert material by creating and bonding the chemically inert material simultaneously by reaction or transformation.

In accordance with embodiments of the present invention, the anvil's geometry or shape can vary in order to accomplish more specific objectives, so long as the anvil is at least partially coated or comprised of the chemically inert material. Additionally, any chemically inert coating, that includes a metal combined with Oxygen, Nitrogen, Carbon or Silicon as a second or third component to respectively form an Oxide, a Nitride, a Carbide or a Silicate improves performance of the anvil in accordance with embodiments of the present invention.

Moreover, any chemically inert coating that includes a chemically inert material, such as but not limited to diamonds, improves performance of the anvil in accordance with embodiments of the present invention.

The principles of embodiments of the present invention enable full penetration during friction stir welding of traditionally non-friction stir weldable materials, such as steels, titanium, and other high temperature materials because the tool does not stick to the anvil or work pieces and an enhanced weld is achieved.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

Reference will now be made to the drawings in which the various elements of the present invention will be given numerical designations and in which the invention will be discussed so as to enable one skilled in the art to make and use the invention. It should be understood that the following description is only exemplary of the principles of the present invention, and should not be viewed as narrowing the claims that follow.

Some embodiments of the invention disclosed herein provide for the full or partial penetration during friction stir welding of high temperature materials, such as stainless steels. With new advances in the tools used in friction stir welding devices and processes, different materials with higher melting materials than those used in the past are now capable of successful friction stir welds. The high temperatures and pressures required to join high temperature materials or work pieces make it necessary to have a diffusion barrier between the work pieces and support so as to preclude diffusion bonding between the work pieces and prevent deformation of the anvil. Experimentation reveals that diffusion bonding mechanical bonding, and deformation occur between the work pieces and the conventional or standard steel anvil when joining friction stir welding higher temperature materials. Thus, present embodiments described herein prevent such bonding of the anvil to the work pieces during the friction stir welding process and minimizes, if not eliminates altogether, anvil deformation.

In the specification and claims, the term 'higher temperature materials' refers to those compositions or work pieces that are not easily friction stir welded using traditional friction stir welding tools. These compositions are exemplified by, but not limited to steels, stainless steels, nickel alloys and titanium alloys. When friction stir welding the aforementioned materials, temperatures exceeding 1300 degrees Celsius and pressures exceeding ten tons of force are typical.

Figure 1:
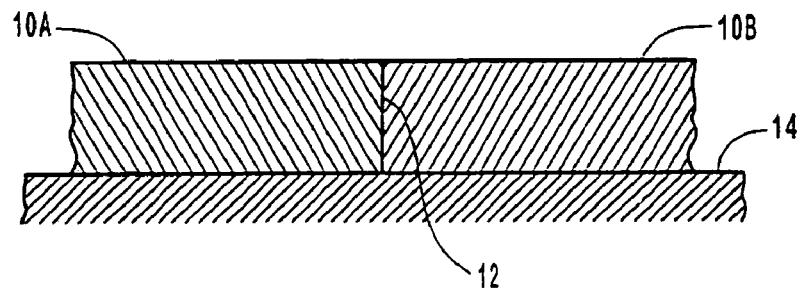
FIG. 1 is a cross sectional view illustrating the face to be welded, wherein the illustration includes both the joint line of the work pieces and supporting anvil.

FIG. 1 demonstrates a cross-sectional view through the face to be welded, showing two work pieces and a supporting anvil 14. The view shows welding plates 10A and 10B being butted against one another at joint 12.

Figure 2:
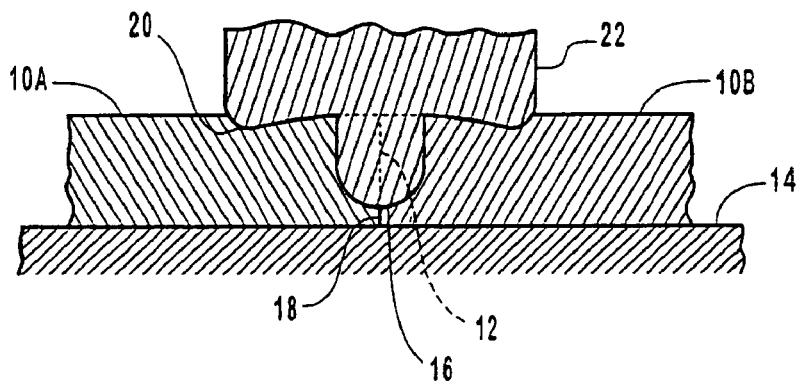
FIG. 2 is another cross-sectional illustration of the face to be welded and shows the friction stir welding tool operating within the work pieces.
Figure 3:
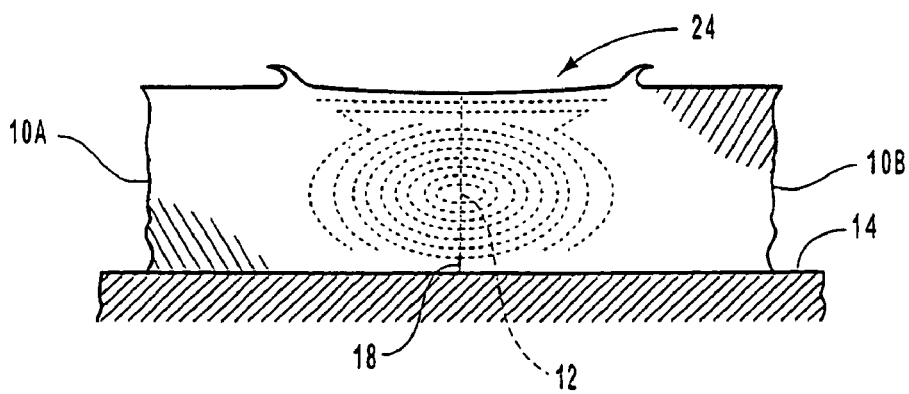
FIG. 3 depicts a cross-sectional view of the face after welding with conventional anvils.

FIG. 2 shows a friction stir welding tool 22 and welding plates 10A and 10B. Pin 16 frictionally plasticizes the material and welds the plate. When joining high temperature materials, the state of the art is to avoid full penetration leaving an unjoined section 18. Such lack of penetration, however, results in a weld having a cross section 24, as illustrated in FIG. 3, where the bottom portion of the weld 18 is difficult upon simple examination to determine whether or not the weld is or is not complete.

Figure 4:
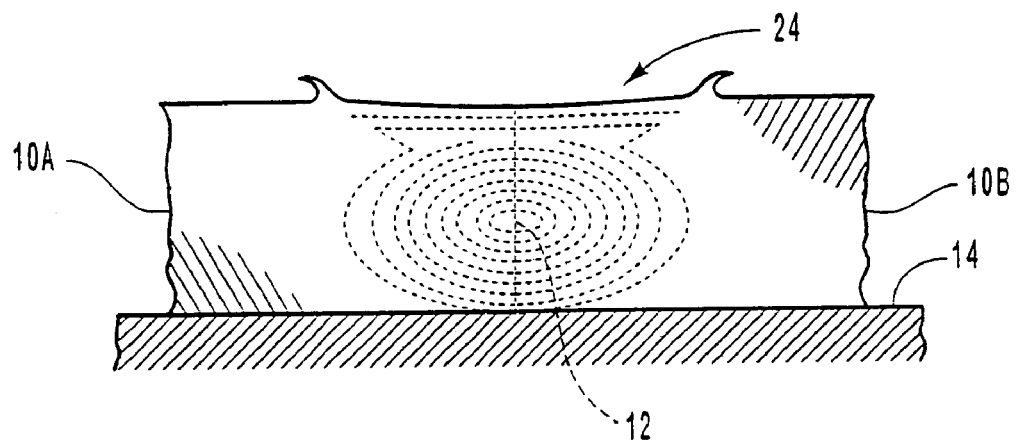
FIG. 4 depicts a cross-sectional view of the face after welding with embodiments of the present invention as disclosed herein.

FIG. 4 shows a cross section 24 of a weld that is joined in accordance with principles of embodiments of the present invention. A coated anvil 14 is illustrated that allows full penetration without the risk of diffusion or mechanical bonding the work pieces to the anvil. The anvil may be coated with an inert material that resists diffusion bonding.

Figure 5:
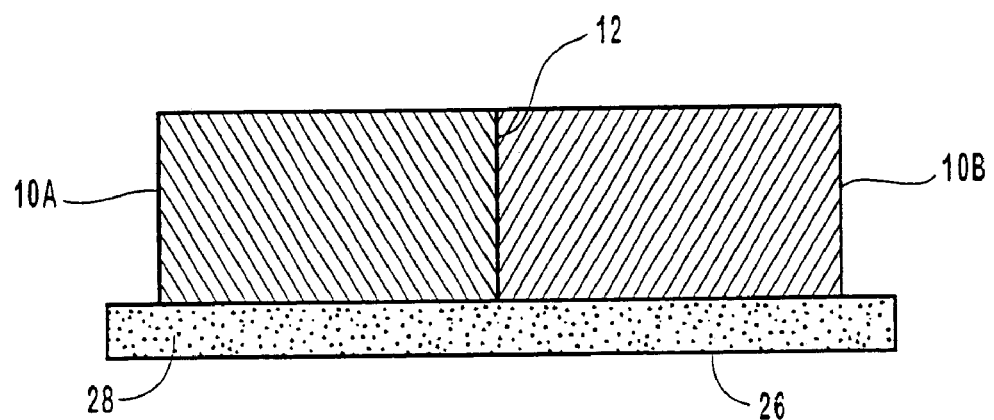
FIG. 5 illustrates a cross-sectional view depicting the face to be welded and further depicting a coated diffusion barrier on the anvil.

In one embodiment, a flat rectangular anvil that is spray-coated is used. FIG. 5 shows a cross-sectional view of such a coated anvil. The illustrated anvil includes a conventional steel core 28, which is sprayed with an inert coating 26 to resist diffusion bonding.

In accordance with the present invention, chemical vapor deposition is an alternative method for depositing materials on the conventional steel core. These materials include, for example and not by way of limitation, carbides, nitrides, oxides and silicates.

The inert coating shown in FIG. 5 may be applied to the conventional steel core through, for example, a powder-coating process. An inert powder is spread over the existing steel anvil before placing the work pieces in a position ready for friction stir welding. As the work pieces move across the anvil, the powder coats the bottom of the work pieces and resists bonding.

The coating in FIG. 5 may alternatively be applied through anodization. Accordingly, the anvil is suspended in an electrolyte bath as an anode, and a current is passed through it. This process produces oxygen at the anode surface that reacts with the metal to form an oxide layer.

Figure 6:
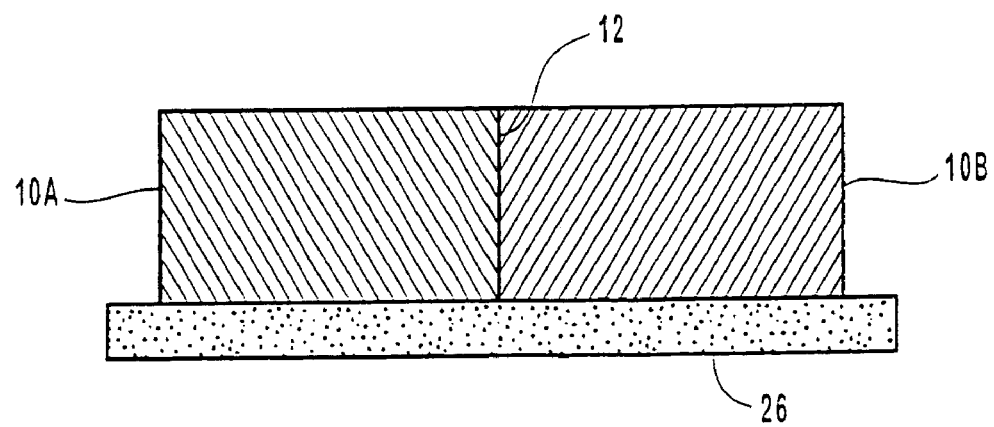
FIG. 6 is yet another cross-sectional view illustrating the face to be welded and an anvil that is composed of an inert diffusion barrier.

FIG. 6 illustrates an anvil that consists completely of the inert material 26. Embodiments embrace the use of such an anvil as an insert.

An alternative embodiment for an anvil includes, but is not limited to, a horizontal rotatable cylinder or roller. This and other geometries are intended to be included within the scope of embodiments of the present invention.

The providing of an anvil that is covered with or includes inert chemicals teaches away from traditional techniques because of the high cost of friction stir welding bits and economic pressures, which do not allow many to try full penetration with high temperature materials.

Although coating may not typically prevent deformation of the anvil when the anvil is comprised of all types of materials, a coating typically prevents diffusion bonding in anvils constructed of most types of materials. In addition, both the prevention of diffusion bonding and deformation occurs in anvils that are formed from materials that are highly resistant to heat deformation and that are coated according to the teachings of embodiments of the present invention. Subsequent welds on a deformed table or anvil typically causes severe problems with surface location, however, embodiments of the present invention include coated and non-coated solid anvil materials that maintain their elastic modulus at elevated temperatures and will not diffusion weld (i.e., above steels 30 million psi). Some of these materials are made from the diffusion barrier materials discussed above. Embodiments also include the use of marble and/or granite. Liquid cooling of the anvil or of the table on which the work pieces are situated regulate the flow of heat, which can be used as a control parameter for weld quality and to maintain table modulus during friction stir welding. Solid ceramic materials may be used in accordance with embodiments of the present invention to control heat flow based on their thermal conductivity. Solid ceramic materials may also be used as anvils and do not typically allow diffusion bonding or deformation.

Those skilled in the art will readily appreciate that many modifications are possible in the exemplary embodiments without materially departing from the teachings and advantages provided herein. Accordingly, all such modifications are intended to be included within the scope of embodiments of the present invention.

Thus, as discussed herein, the embodiments of the present invention embrace friction stir welding and, more particularly, an anvil used in friction stir welding processes that is either coated with or manufactured from a substance capable of resisting anvil deformation and preventing diffusion bonding or mechanical bonding between the anvil and the friction stir welding tool or work piece when friction stir welding high temperature materials or work pieces. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for manufacturing a friction stir welding anvil that is capable of friction stir welding high temperature materials, the method comprising the steps of:
    providing an anvil core that is configured to support materials being welded together by a friction stir welding process; and
    coating a chemically inert material onto the at least a portion of the core using a powder coating process, wherein the chemically inert material is in a powder form.

2. A method as recited in claim 1, wherein the step of coating the chemically inert material on at least a portion of the core further comprises the step of using a metal and oxygen as the chemically inert material.

3. A method as recited in claim 1, wherein the step of coating the chemically inert material on at least a portion of the core further comprises the step of using a metal and nitrogen as the chemically inert material.

4. A method as recited in claim 1, wherein the step of coating the chemically inert material on at least a portion of the core further comprises the step of using a metal and carbon as the chemically inert material.

5. A method as recited in claim 1, wherein the step of coating the chemically inert material on at least a portion of the core further comprises the step of using a metal and silicon as the chemically inert material.

6. A method as recited in claim 1, wherein the method further comprises the step of selecting the core from the group of core shapes consisting of a flat plate and a rotating wheel.

* * * * *

UNITED STATES PATENT AND TRADEMARK OFFICE
CERTIFICATE OF CORRECTION

PATENT NO. : 7,608,296 B2  Page 1 of 1
APPLICATION NO. : 11/374667
DATED : October 27, 2009
INVENTOR(S) : Packer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this

Twelfth Day of October, 2010

David J. Kappos
*Director of the United States Patent and Trademark Office*